United States Patent
Lindner

(10) Patent No.: US 7,089,922 B2
(45) Date of Patent: Aug. 15, 2006

(54) APPARATUS, SYSTEM, AND METHOD FOR MINIMIZING $NO_X$ IN EXHAUST GASSES

(75) Inventor: Frederick H. Lindner, North Vernon, IN (US)

(73) Assignee: Cummins, Incorporated, Colombus, IN (US)

(*) Notice: Subject to any disclaimer, the term of this patent is extended or adjusted under 35 U.S.C. 154(b) by 0 days.

(21) Appl. No.: 11/023,027

(22) Filed: Dec. 23, 2004

(65) Prior Publication Data
US 2006/0137669 A1 Jun. 29, 2006

(51) Int. Cl.
*F02D 41/00* (2006.01)
*F02D 41/30* (2006.01)

(52) U.S. Cl. .......................... 123/673; 60/275

(58) Field of Classification Search ............. 123/673, 123/703; 73/23.32; 60/275, 285, 274, 276
See application file for complete search history.

(56) References Cited

U.S. PATENT DOCUMENTS

| | | | | |
|---|---|---|---|---|
| 4,372,270 A | * | 2/1983 | Latsch et al. | 123/703 |
| 4,426,987 A | | 1/1984 | Latsch et al. | 123/571 |
| 4,483,300 A | * | 11/1984 | Hosaka et al. | 123/673 |
| 4,716,874 A | * | 1/1988 | Hilliard et al. | 123/406.14 |
| 4,945,721 A | | 8/1990 | Cornwell et al. | 60/274 |
| 5,199,408 A | * | 4/1993 | Wataya | 123/672 |
| 5,383,333 A | | 1/1995 | Logothetis et al. | 60/276 |
| 5,651,353 A | | 7/1997 | Allston | 123/673 |
| 5,730,111 A | | 3/1998 | Kaji et al. | 123/673 |
| 5,806,506 A | | 9/1998 | Kitamura et al. | 123/673 |
| 5,970,706 A | | 10/1999 | Williamson et al. | 60/274 |
| 6,148,808 A | | 11/2000 | Kainz | 123/673 |
| 6,224,837 B1 | | 5/2001 | Okamoto et al. | 422/188.04 |
| 6,273,075 B1 | | 8/2001 | Choi et al. | 123/673 |
| 6,311,480 B1 | * | 11/2001 | Suzuki et al. | 60/276 |
| 6,314,952 B1 | | 11/2001 | Turin et al. | 123/673 |
| 6,332,965 B1 | * | 12/2001 | Sugiyama et al. | 204/425 |
| 6,382,198 B1 | | 5/2002 | Smith et al. | 123/673 |
| 6,499,474 B1 | | 12/2002 | Wachi et al. | 123/673 |
| 6,526,954 B1 | * | 3/2003 | Baranzahi et al. | 123/673 |
| 6,708,681 B1 | * | 3/2004 | Hosoya et al. | 123/681 |
| 6,828,156 B1 | * | 12/2004 | Ohsuga et al. | 436/135 |
| 2002/0096157 A1 | | 7/2002 | Damitz et al. | 123/673 |
| 2003/0052265 A1 | | 3/2003 | Kato | 250/281 |
| 2004/0024519 A1 | | 2/2004 | Deobert et al. | 701/109 |
| 2004/0025497 A1 | | 2/2004 | Truce | 60/275 |

(Continued)

FOREIGN PATENT DOCUMENTS

WO WO2004020798 * 11/2004

*Primary Examiner*—Mahmoud Gimie
(74) *Attorney, Agent, or Firm*—Kunzler & Associates

(57) ABSTRACT

An apparatus, system, and method are disclosed for minimizing $NO_x$ in exhaust gasses. The apparatus includes an ionization module configured to at least partially ionize an exhaust gas of an engine. A characterization module is configured to identify $NO_x$ ions present in the ionized exhaust gas, and an engine control module is configured to communicate with the characterization module and modify engine parameters in response to identified $NO_x$ levels. The system includes an internal combustion engine having an intake manifold configured to deliver an air-fuel mixture to at least one combustion chamber, an exhaust manifold configured to receive exhaust gasses from the combustion chamber, and the apparatus. The method includes controlling an ionization module configured to at least partially ionize an exhaust gas of an engine, identifying $NO_x$ ions present in the ionized exhaust gas, and modifying one or more selected engine parameters in response to identified $NO_x$ levels.

24 Claims, 6 Drawing Sheets

U.S. PATENT DOCUMENTS

2004/0039514 A1    2/2004   Steichen et al. ............ 709/109
2004/0089055 A1*   5/2004   Cramer et al. ............. 73/23.32
2004/0159547 A1*   8/2004   Haraguchi et al. .......... 204/424

* cited by examiner

APPARATUS, SYSTEM, AND METHOD FOR MINIMIZING $NO_x$ IN EXHAUST GASSES

BACKGROUND OF THE INVENTION

1. Field of the Invention

This invention relates to minimizing $NO_x$ in exhaust gasses produced by internal combustion engines and more particularly relates to determining $NO_x$ levels produced by individual combustion chambers and modifying selected engine parameters in response to $NO_x$ levels.

2. Description of the Related Art

When combustion occurs in an environment with excess oxygen, peak combustion temperatures increase, leading to the formation of unwanted emissions, such as oxides of Nitrogen ($NO_x$). This problem is often aggravated in the presence of turbocharging, which increases the mass of fresh air flow, thereby increasing the mass of oxygen and nitrogen present in a combustion chamber.

One known technique for reducing unwanted emissions such as $NO_x$ involves introducing chemically inert gases into the fresh air stream for subsequent combustion. By reducing the oxygen concentration of the fresh air stream, the fuel burns slower and peak combustion temperatures are reduced, thereby lowering the production of $NO_x$. In an internal combustion engine environment, such chemically inert gases are readily abundant in the form of exhaust gases, and one known method for introducing inert gases is through the use of an Exhaust Gas Recirculation (EGR) system. EGR systems introduce exhaust gas from the exhaust manifold into the fresh air stream flowing to the intake manifold valve. However, lowering combustion temperatures in such a manner may actually increase emissions of particulate matters and unburned hydrocarbons.

Other methods for reducing $NO_x$ include catalytic converters, and ignition/injector timing control. Catalytic converters typically use two different types of catalysts, a reduction catalyst and an oxidization catalyst. Both the reduction catalyst and the oxidization catalyst are commonly embedded on the surface of a ceramic honeycomb-like structure in order to achieve a maximum surface area of catalyst in the exhaust stream. In both cases, a metal, such as platinum, rhodium, and/or palladium, serves as the catalyst.

The further component of the catalytic converter is the engine control module (ECM) that monitors the exhaust stream, and controls a fuel injection system in response to detected $NO_x$ levels. One method for monitoring the exhaust stream is an oxygen sensor typically installed upstream from the catalytic converter. The oxygen sensor is configured to indicate how much oxygen is in the exhaust. The ECM may subsequently increase or decrease the amount of air being injected into the combustion chamber. Alternatively, the oxygen sensor may be installed downstream from the catalytic converter in order to detect $NO_x$ not being converted by the catalytic converter.

Currently, dedicated $NO_x$ sensors are mostly solid-state electrochemical sensors. Yttria-stabilized zirconia (YSZ) sensors have been used in the exhaust flow to detect $NO_x$ at high temperatures. However, poor accuracy and slow response times plague YSZ sensors and thereby limit their usability. Furthermore, since the sensitivity of an YSZ sensor is also affected by changes in gas composition, in particular the oxygen concentration, cross sensitivity is a major interference problem.

However, a major drawback of common $NO_x$ sensors is the inability to identify correctly which combustion chamber is producing $NO_x$. $NO_x$ sensors are commonly located downstream of the exhaust manifold. As used herein, downstream refers to a direction in which exhaust gas travels away from the engine. FIG. 1 is a perspective side view diagram depicting a portion of an internal combustion engine 100 (hereinafter "engine") having an exhaust manifold in accordance with the prior art. The engine 100 typically includes a cylinder block 102 coupled to a cylinder head 104.

The cylinder head 104 has intake ports (not shown) for the intake of combustive material, such as an air-fuel mixture, and exhaust ports (not shown) for the exhaust of the combustive material. The exhaust ports are generally coupled to an exhaust manifold 106 that collects exhaust gasses from each combustion chamber or cylinder. A turbocharger 108 may be coupled to the exhaust manifold.

FIG. 2 is a schematic block diagram illustrating a top view of the cylinder head 104 and the exhaust manifold 106 in accordance with the prior art. Many underlying engine components, which are well known to those skilled in the art, but which may not be relevant to this discussion, have been omitted and will not be discussed in great detail herein. The flow of exhaust gasses flows in a direction as indicated by arrow 202, away from the cylinder head 104 and towards a catalytic converter 204. The catalytic converter 204, as described above, reduces $NO_x$ in the exhaust gas flow. An oxygen sensor 206 adapted to detect $NO_x$ may be positioned downstream from the catalytic converter 204 in order to detect $NO_x$ that passes through the catalytic converter 204.

Feedback from the oxygen sensor 206 is typically transmitted to an engine control module 208. The engine control module 208 may then modify engine parameters in order to reduce $NO_x$ production inside the cylinders. Research has indicated that proper control of air/fuel ratio can lower $NO_x$ emissions. However, current $NO_x$ sensors are unable to detect which cylinder is producing the $NO_x$, and the engine control module 208 must therefore modify timing and or air/fuel ratio of all cylinders. This often results in increased particulate emissions, as described above, and reduced engine performance.

From the foregoing discussion, it should be apparent that a need exists for an apparatus, system, and method that detect and correct for $NO_x$ in exhaust gasses. Such an apparatus, system, and method would be further beneficial if they were capable of detecting the levels of $NO_x$ produced in individual cylinders, and selectively modifying engine parameters in response to the detected $NO_x$ levels.

SUMMARY OF THE INVENTION

The present invention has been developed in response to the present state of the art, and in particular, in response to the problems and needs in the art that have not yet been fully solved by currently available Nitrogen Oxide ($NO_x$) minimizing systems. Accordingly, the present invention has been developed to provide an apparatus, system, and method for minimizing $NO_x$ in exhaust gasses that overcome many or all of the above-discussed shortcomings in the art.

The apparatus to minimize $NO_x$ in exhaust gasses comprises an ionization module configured to at least partially ionize an exhaust gas of an engine, a characterization module configured to identify $NO_x$ ions present in the ionized exhaust gas, and an engine control module configured to communicate with the characterization module and modify engine parameters in response to identified $NO_x$ levels.

In one embodiment, the characterization module comprises a metal oxide semiconductor sensor configured to change resistivity in response to the presence of $NO_x$. Additionally, the characterization module may include an acceleration module configured to accelerate ions toward a surface of the metal oxide semiconductor.

In a further embodiment, the characterization module may comprise an ion sensor module configured to detect an ion current. The engine control module may be configured to communicate with a plurality of characterization modules and modify engine parameters in response to identified $NO_x$ levels. In one embodiment, the engine parameters may include timing, fueling, and recirculation of exhaust gas.

A system of the present invention is also presented to minimize $NO_x$ in exhaust gasses. In particular, the system, in one embodiment, includes an internal combustion engine having an intake manifold configured to deliver an air-fuel mixture to at least one combustion chamber, and an exhaust manifold configured to receive exhaust gasses from the combustion chamber. The system also includes an ionization module configured to at least partially ionize the exhaust gasses of the internal combustion engine.

The system in certain embodiments also includes a characterization module configured to identify $NO_x$ ions present in the ionized exhaust gas, and an engine control module configured to communicate with the characterization module and modify engine parameters in response to identified $NO_x$ levels.

A method of the present invention is also presented for minimizing $NO_x$ in exhaust gasses. The method in the disclosed embodiments substantially includes the steps necessary to carry out the functions presented above with respect to the operation of the described apparatus and system, though the method may also be conducted independently thereof. In one embodiment, the method includes controlling an ionization module configured to at least partially ionize an exhaust gas of an engine, identifying $NO_x$ ions present in the ionized exhaust gas, and modifying engine parameters in response to identified $NO_x$ levels.

The method may also include sensing a change in resistivity in response to the presence of $NO_x$, and accelerating ions toward a surface of a metal oxide semiconductor. In a further embodiment, the method includes detecting an ion current, and modifying engine parameters in response to identified $NO_x$ levels.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
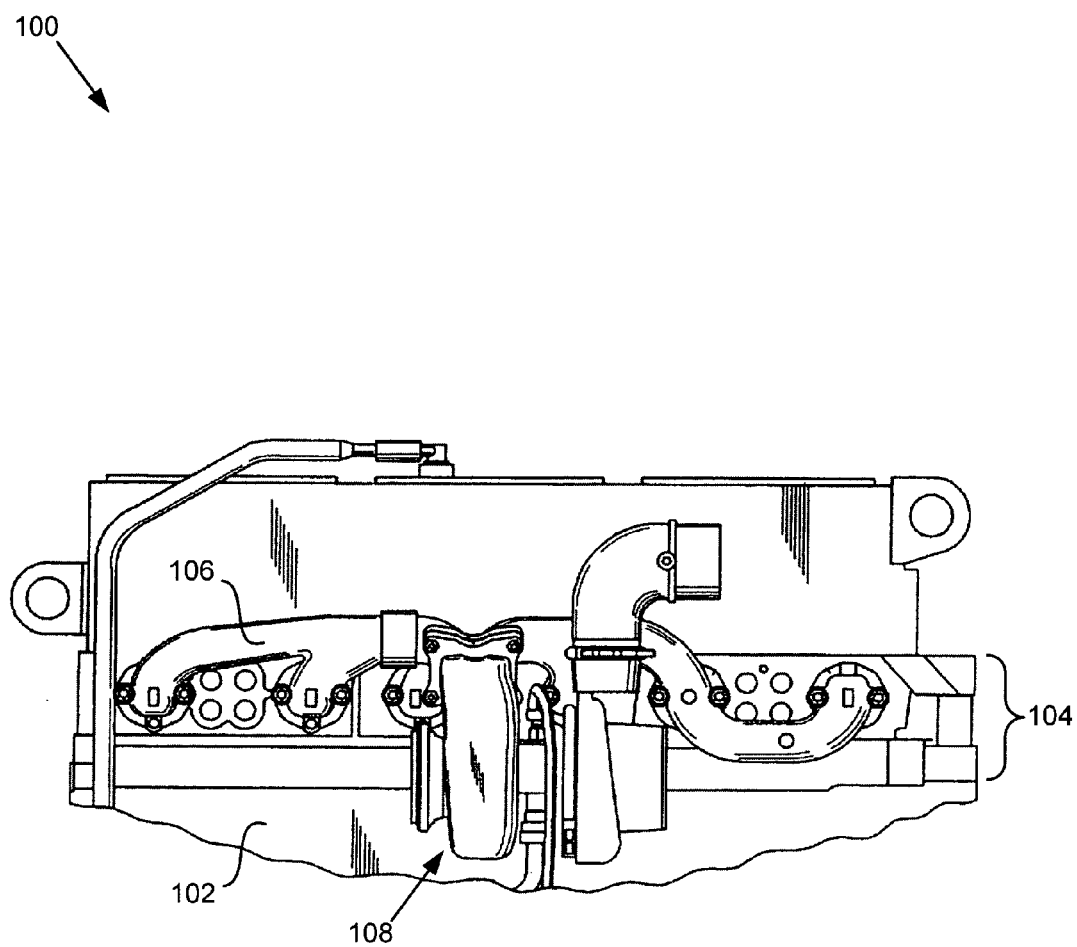
FIG. 1 is a perspective side view diagram depicting a portion of an internal combustion engine having an exhaust manifold in accordance with the prior art.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 2:
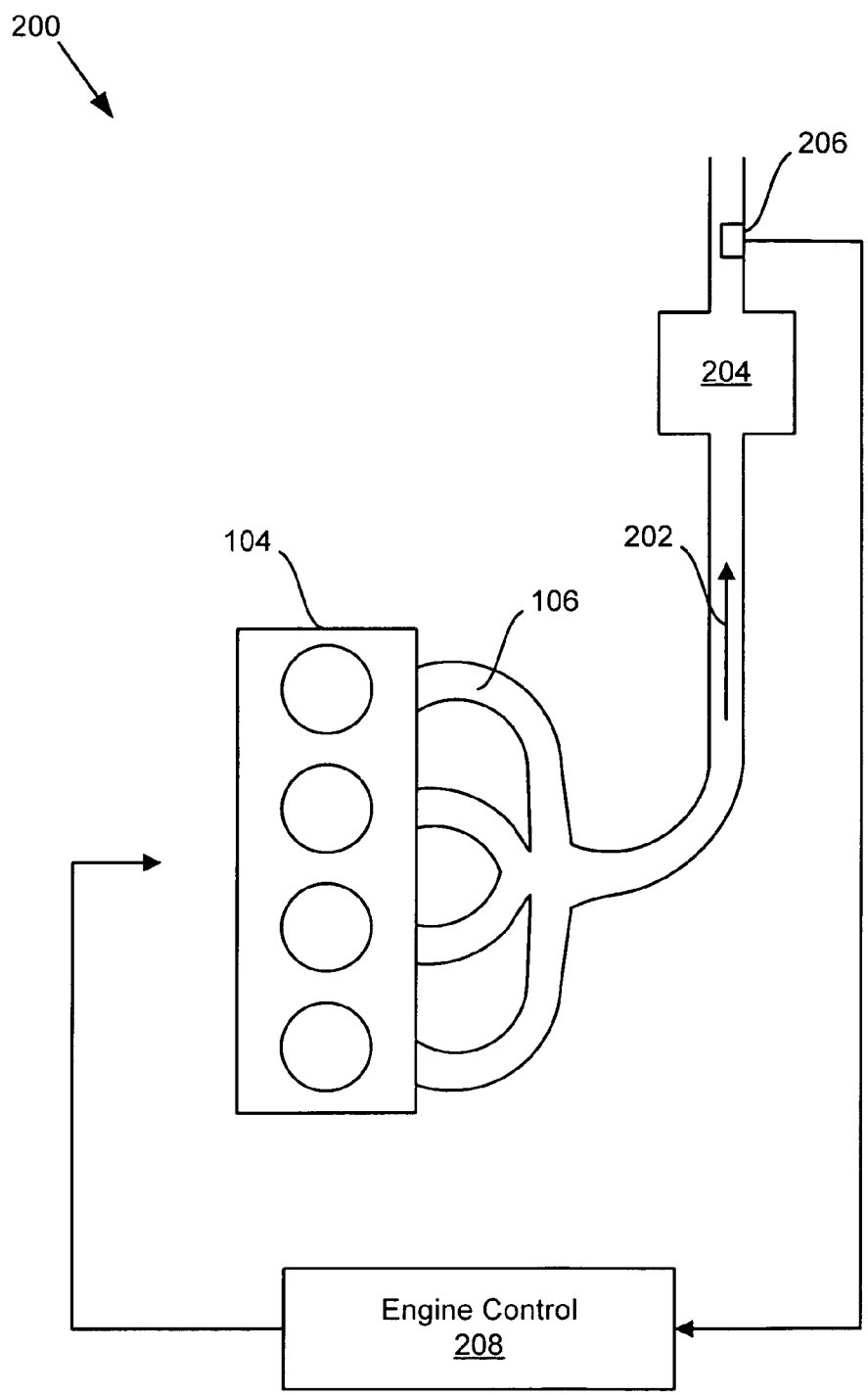
FIG. 2 is a schematic block diagram illustrating a top view of the cylinder head and exhaust manifold in accordance with the prior art.
Figure 3:
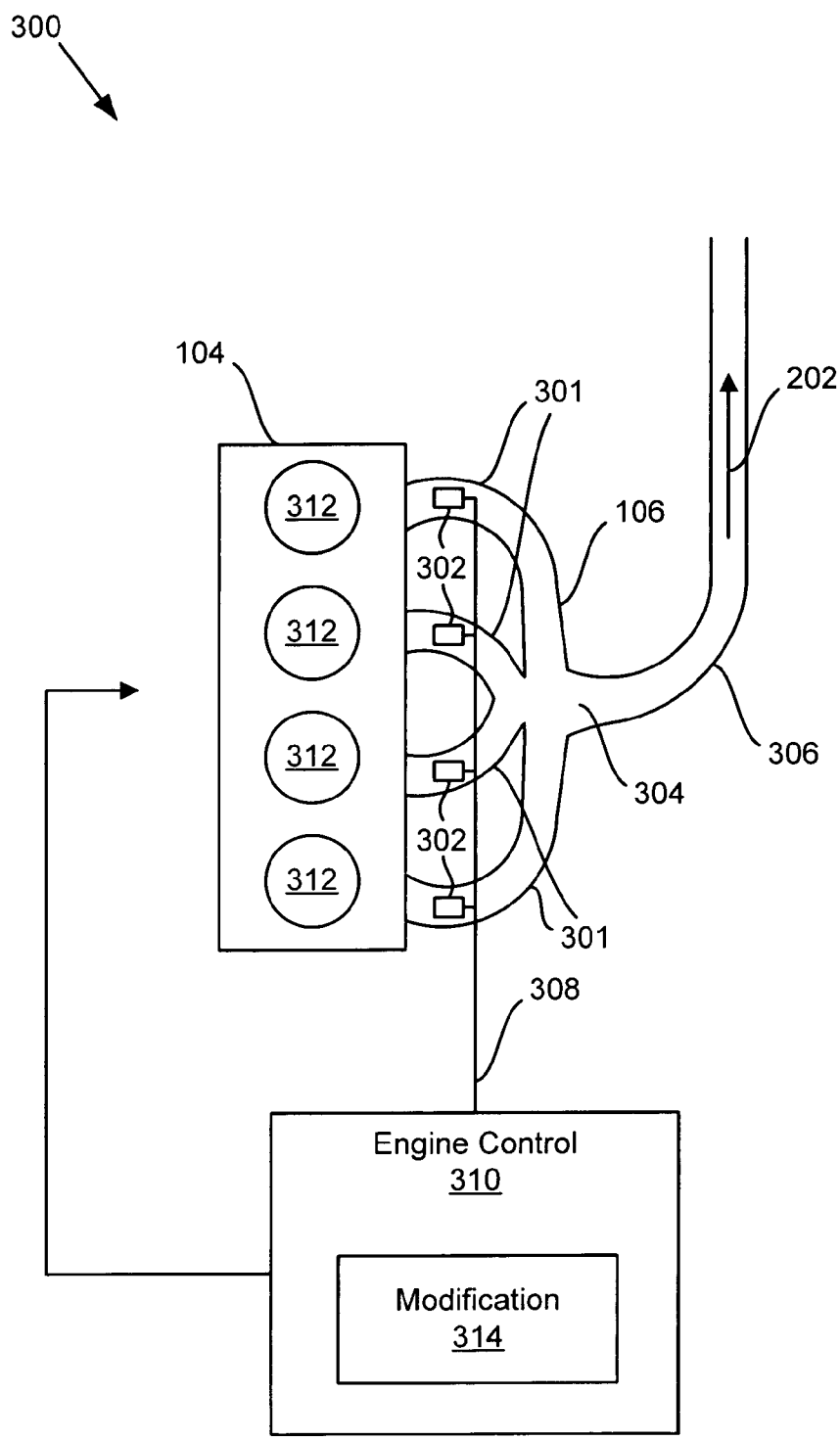
FIG. 3 is a schematic block diagram graphically illustrating one embodiment of a system for minimizing $NO_x$ in exhaust gasses in accordance with the present invention.

FIG. 3 is a schematic block diagram graphically illustrating one embodiment of a system 300 for minimizing $NO_x$ in exhaust gasses in accordance with the present invention. The system 300 includes the cylinder head 104, and the exhaust manifold 106, as described above with reference to FIGS. 1 and 2. The exhaust manifold 106, as depicted, is provided with a plurality of exhaust ports. Each exhaust port 301 is coupled to the cylinder head 104 and is configured to capture exhaust gasses for the combustion chamber or cylinder. In one embodiment, the system 300 may comprise a plurality of characterization modules 302. Each characterization module 302 is placed within the exhaust port 301 (also referred to as exhaust manifold 106) upstream of a union 304. The union 304 is the point of the exhaust manifold 106 where exhaust gasses from each cylinder flow into a common exhaust pipe 306.

The characterization module 302 is in one embodiment configured to identify $NO_x$ levels in the exhaust gas. A communication channel 308 such as a cable or bus couples each characterization module 302 with an engine control module 310 (ECM). The ECM 310 is configured to control and manage the overall operation of the engine 100. The ECM 310 may include inputs for interfacing with various sensors and systems coupled to the engine 100. The various sensors and systems related to internal combustion engines are well known to those skilled in the art and will not be given further discussion herein.

Each characterization module 302 is configured to communicate with the ECM 310 over the communication channel 308. The ECM 310 collects $NO_x$ level information from each characterization module 302 and may be configured to calculate an average $NO_x$ level. Alternatively, the ECM 310 may be configured to maintain a history of $NO_x$ levels for each cylinder. When the ECM 310 determines that one cylinder 312 is producing more $NO_x$ than other cylinders 312, the ECM 310 communicates the offending cylinder position to the modification module 314. The modification module 314 is in one embodiment configured to minimize $NO_x$ levels by altering engine parameters including, but not limited to, timing, fueling, and recirculation of exhaust gasses. The alteration of engine parameters may be conducted for together for each cylinder, but in one embodiment, is conducted individually for each cylinder, in order to individually enhance the performance of each cylinder.

Figure 4:
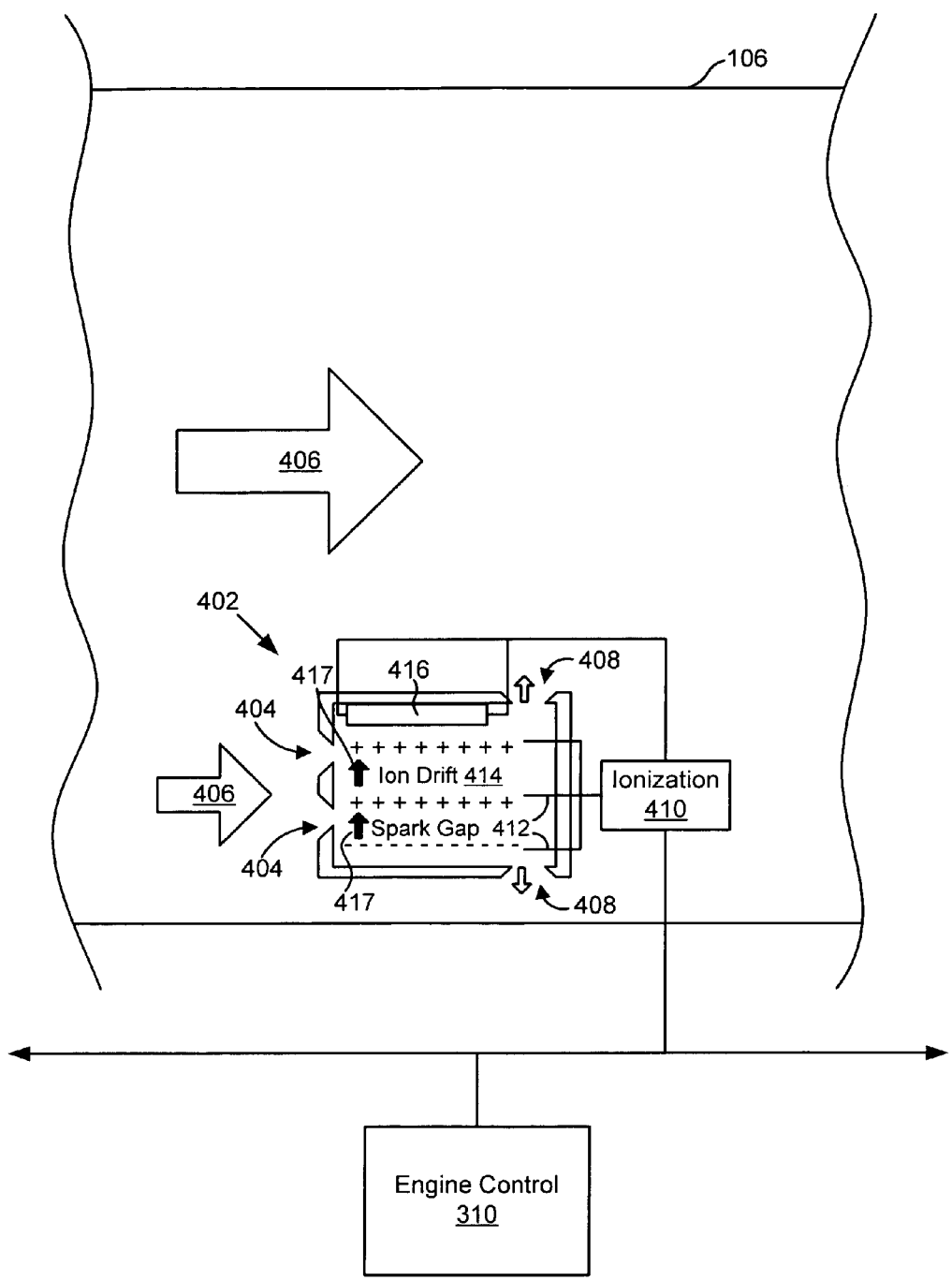
FIG. 4 is a schematic block diagram illustrating one embodiment of a metal oxide semiconductor characterization module in accordance with the present invention.

FIG. 4 is a schematic block diagram illustrating one embodiment of a metal oxide semiconductor characterization module 402 in accordance with the present invention. As depicted, the characterization module 402 may be mounted to one side of the exhaust manifold 106, as described above with respect to FIG. 3. In one embodiment, the characterization module 402 includes a plurality of inlets 404 that allow the flow of exhaust gas through the characterization module 402. The flow of exhaust gas is indicated in FIG. 4 by arrows 406.

The characterization module 402 is configured to allow exhaust gas to alternatively flow, stagnate, and subsequently exit the module through outlets 408. While the gas stagnates within the characterization module 402, an ionization module 410 applies a voltage to a series of electrodes 412. During an exhaust event, the rapid flow of the exhaust gas from the engine clears the characterization module of any ions previously accumulated. When an exhaust port (not shown) of the engine closes, the exhaust gasses in the characterization module 402 stop flowing and stagnate in the vicinity of the electrodes 412. The exhaust gas between the electrodes 412 is ionized by the ionization module. The generated ions are accelerated into an ion drift region and subsequently towards a metal oxide semiconductor sensor 416 as indicated by arrows 417.

The ionization module 410 measures the resistance of the metal oxide semiconductor sensor 416 with respect to time during each exhaust cycle in order to characterize the exhaust gas inside the characterization module 402. The adsorption of ions onto the surface of the metal oxide semiconductor sensor 416 causes a change in the electrical resistance of the metal oxide semiconductor sensor 416. The resistance change is a result of a gain or loss of surface electrons due to adsorbed oxygen reacting with the ions. The magnitude of the change in electrical resistance is directly related to the concentration of ions present in the exhaust gas.

The metal oxide semiconductor sensor 416 may be "tuned" to detect different types of ions. In the depicted embodiment, the metal oxide semiconductor sensor 416 is formed of a material selected to be very sensitive to $NO_x$ ions. For example, the metal oxide semiconductor sensor 416 may be formed of a titanium based oxide. Alternatively, the metal oxide semiconductor sensor 416 may be formed from materials including, but not limited to, Tungsten Oxides, Tin Oxides, Indium Oxides, and Iron Oxides. A metal oxide semiconductor sensor suitable for use in accordance with the present invention is the Senplex® sensor available from Dupont Chemical of White Plains, N.Y.

Figure 5:
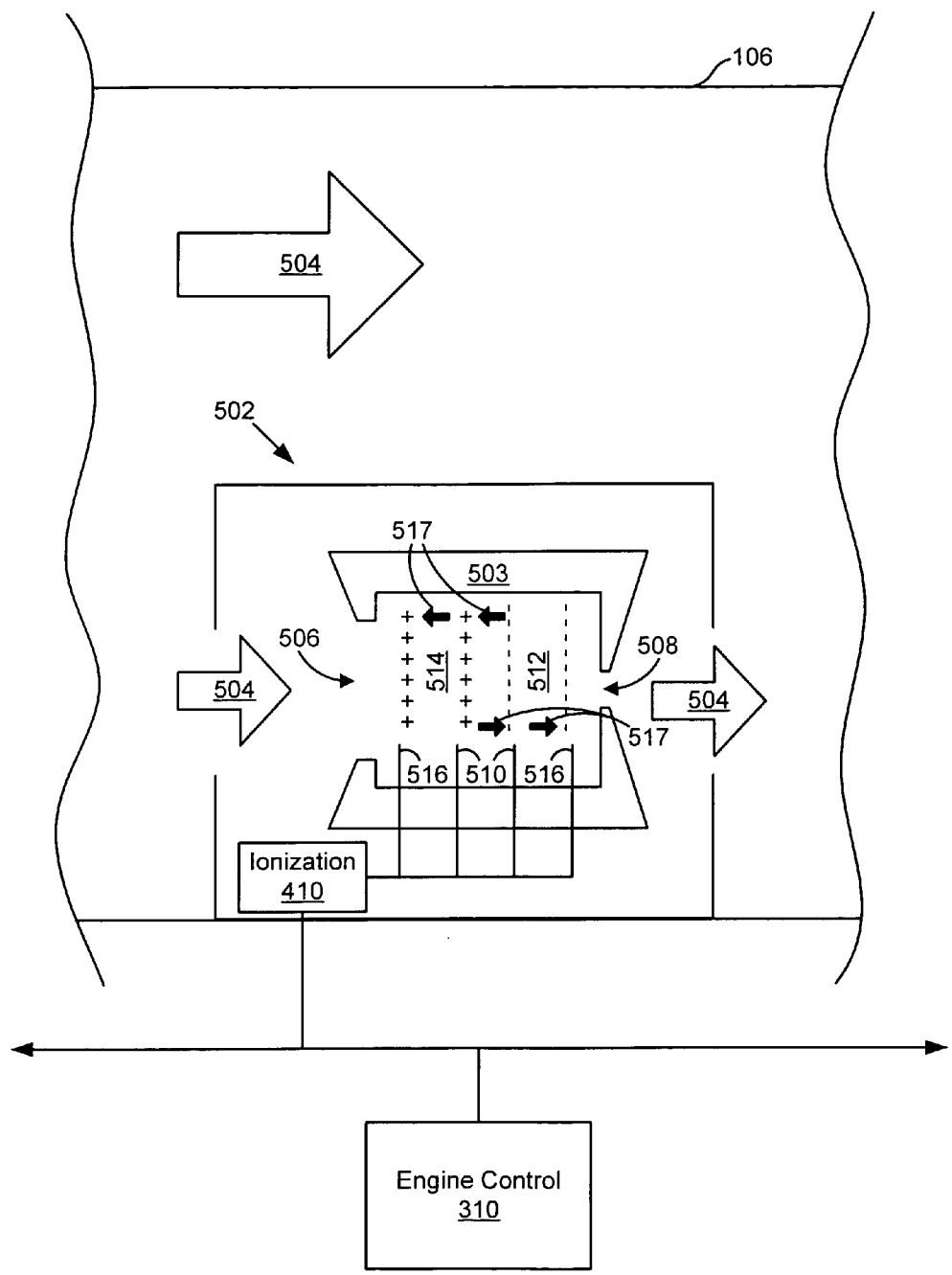
FIG. 5 is a schematic block diagram illustrating an alternative embodiment of a characterization module in accordance with the present invention.

FIG. 5 is a schematic block diagram illustrating an alternative embodiment of a characterization module 502 in accordance with the present invention. In one embodiment, the characterization module 502 may comprise an ion sensor module 503. During an exhaust event, exhaust gasses flow away from the engine through the exhaust manifold 106 in a general direction as indicated by arrows 504. The ion sensor module 503 includes at least one inlet 506 and at least one outlet 508.

When the exhaust port closes, the residual exhaust gas inside of the ion sensor module stagnates in the vicinity of electrodes 510. The ionization module 410 is configured to supply a high voltage to the electrodes 510 and ionize the exhaust gas, which causes a spark current to flow. Ions between the electrodes 510 accelerate out from between the electrodes 510 into the positive 512 and negative 514 ion drift regions where they drift towards low voltage electrodes 516, as indicated by arrows 517.

The ionization module 410 measures the spark current at electrodes 510 and the drift currents at electrodes 516 with respect to time over each exhaust cycle to characterize the exhaust gas. The ionization module 410 may be configured to measure aspects such as current magnitude, current peak, time to current decay, and the change in discharge. The characterization module 502 is configured to communicate ion measurements with the ECM.

The schematic flow chart diagram that follows is generally set forth as a logical flow chart diagram. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method.

Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 6:
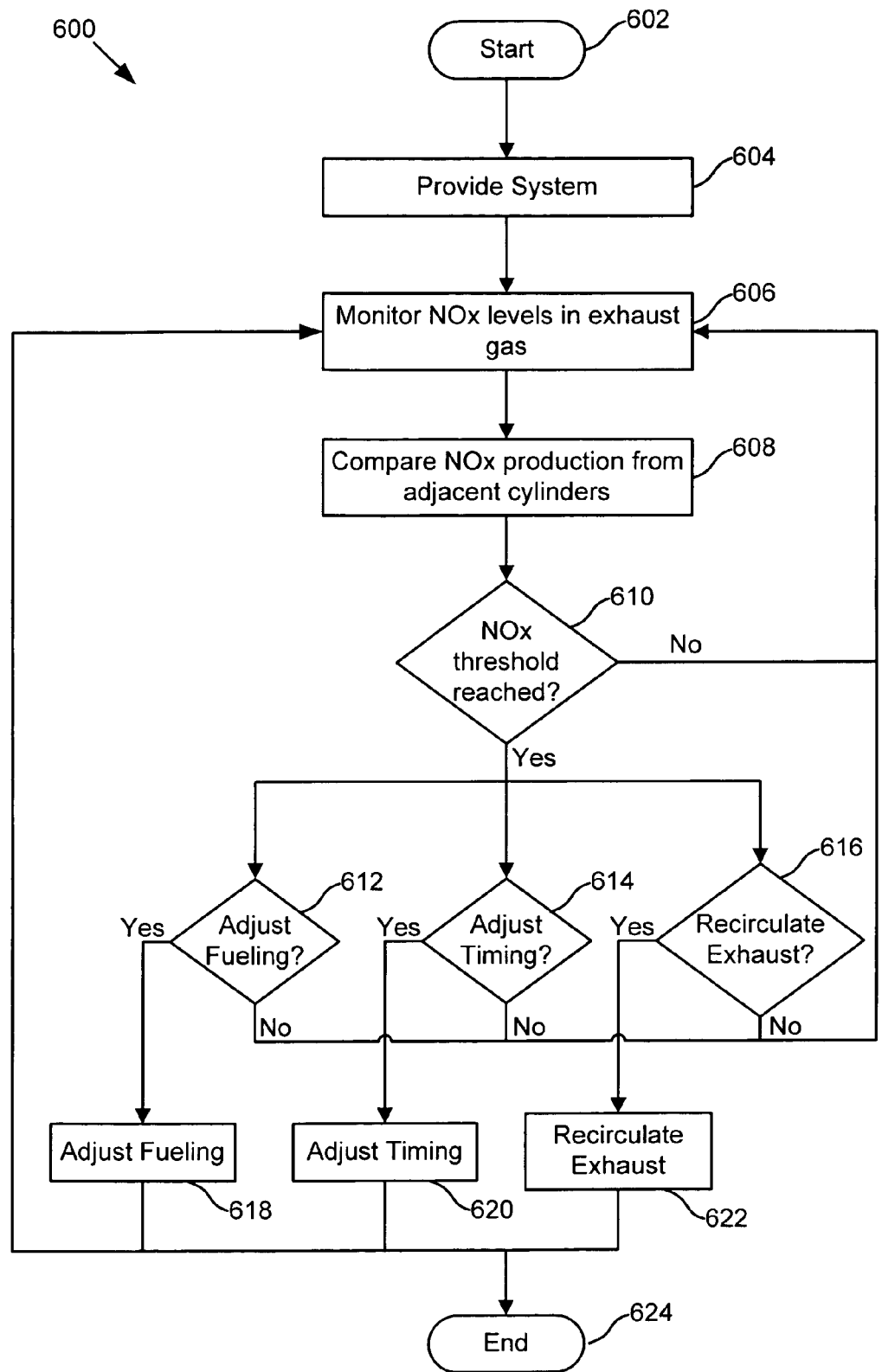
FIG. 6 is a schematic flow chart diagram illustrating one embodiment to a method for minimizing $NO_x$ in exhaust gasses.

FIG. 6 is a schematic flow chart diagram illustrating one embodiment of a method 600 for minimizing $NO_x$ in exhaust gasses. The method 600 starts 602 and the system 300 for minimizing $NO_x$ in exhaust gasses is provided 604. In one embodiment, the system 300 is provided 604 with a characterization module having a metal oxide semiconductor sensor 416. Alternatively, the system 300 is provided 604 with an ion sensor module 503.

The characterization module 302 then monitors 606 $NO_x$ levels in the exhaust gas and communicates with the ECM 310. The ECM 310 maintains $NO_x$ level information for each cylinder 312 and determines if one or more cylinders are producing $NO_x$. In one embodiment, the ECM 310 compares 608 the $NO_x$ levels of one cylinder with the $NO_x$ levels of adjacent cylinders. Alternatively, the ECM 310 may make the determination without comparing 608 one cylinder with adjacent cylinders.

If a $NO_x$ threshold is reached 608, the modification module 314 adjusts engine parameters to minimize the $NO_x$ levels. In one embodiment, the modification module 314 may adjust 612 fueling, adjust 614 timing, or recirculate 616 exhaust. Adjusting the timing may, in one embodiment, include advancing or retarding the injection of an air/fuel mixture into the cylinder. The ECM 310 determines whether all three parameters are adjusted 618, 620, 622. In a further embodiment, one or a combination of any three parameters may be adjusted 618, 620,622. Alternatively, other engine parameters that are selectable by cylinder may be adjusted to minimize $NO_x$ levels.

If the $NO_x$ threshold is not reached 610, the characterization module 302 continues monitoring 606 the exhaust gasses. Likewise, following an adjustment 618, 620, 622 of engine parameters, the characterization module 302 continues monitoring 606 the exhaust gasses. The method 600 ends when the engine is turned off.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to minimize Nitrogen Oxides ($NO_x$) in exhaust gasses, the apparatus comprising:

an ionization module configured to at least partially ionize an exhaust gas of an engine;

a characterization module configured to identify $NO_x$ ions present in the ionized exhaust gas; and an engine control module configured to communicate with the characterization module and modify engine parameters in response to the identified $NO_x$ levels, wherein the engine control module is further configured to communicate with a plurality of characterization modules and modify engine parameters in response to identified $NO_x$ levels individually for each of a plurality of cylinders.

2. The apparatus of claim 1, wherein the characterization module further comprises a metal oxide semiconductor sensor configured to change resistivity in response to the presence of $NO_x$.

3. The apparatus of claim 2, wherein the metal oxide semiconductor is formed of a material selected to be sensitive to $NO_x$.

4. The apparatus of claim 3, wherein the material is selected from a group consisting of Titanium Oxides, Tungsten Oxides, Tin Oxides, Indium Oxides, and Iron Oxides.

5. The apparatus of claim 2, wherein the metal oxide semiconductor sensor further comprises an acceleration module configured to accelerate ions toward a surface of the metal oxide semiconductor.

6. The apparatus of claim 1, wherein the characterization module further comprises an ion sensor module configured to detect an ion current.

7. The apparatus of claim 1, wherein the engine parameters are selected from a group consisting of timing, fueling, and recirculation of exhaust gas.

8. A system to minimize Nitrogen Oxides ($NO_x$) in exhaust gasses, the system comprising:

an internal combustion engine having an intake manifold configured to deliver an air-fuel mixture to at least one combustion chamber and an exhaust manifold having an exhaust port for each combustion chamber, the exhaust ports configured to receive exhaust gasses from the combustion chamber;

an ionization module configured to at least partially ionize the exhaust gasses of the internal combustion engine;

a characterization module configured to identify $NO_x$ ions present in the ionized exhaust gas;

an engine control module configured to communicate with the characterization module and modify one or more engine parameters in response to the identified $NO_x$ levels;

further comprising a plurality of ionization modules and a plurality of characterization modules, each exhaust port having at least one ionization module and at least one characterization module; and wherein the engine control module is configured to communicate with the plurality of characterization modules and selectively adjust engine parameters for individual combustion chambers in response to identified $NO_x$ levels.

9. The system of claim 8, wherein the characterization module further comprises a metal oxide semiconductor sensor configured to change resistivity in response to the presence of $NO_x$.

10. The system of claim 8, wherein the metal oxide semiconductor is formed of a material selected to be sensitive to $NO_x$.

11. The system of claim 8, wherein the material is selected from a group consisting of Titanium Dioxide, and Iron Oxide.

12. The system of claim 8, wherein the metal oxide semiconductor sensor further comprises an acceleration module configured to accelerate ions toward a surface of the metal oxide semiconductor.

13. The system of claim 8, wherein the characterization module further comprises an ion sensor module configured to detect an ion current.

14. The system of claim 8, wherein the one or more selected engine parameters are selected from a group consisting of timing, fueling, and recirculation of exhaust gas.

15. A signal bearing medium tangibly embodying a program of machine-readable instructions executable by a digital processing apparatus to perform an operation to minimize Nitrogen Oxides ($NO_x$) in exhaust gasses, the operation comprising:

controlling an ionization module configured to at least partially ionize an exhaust gas of an engine;

an operation to accelerate ions toward a surface of a metal oxide semiconductor;

identifying $NO_x$ ions present in the ionized exhaust gas; and modifying one or more selected engine parameters in response to the identified $NO_x$ levels.

16. The signal bearing medium of claim 15, wherein the instructions further comprise an operation to change resistivity in response to the presence of $NO_x$.

17. The signal bearing medium of claim 15, wherein the instructions further comprise an operation to detect an ion current.

18. The signal bearing medium of claim 15, wherein the instructions further comprise an operation to modify the engine parameters in response to identified $NO_x$ levels.

19. A method to minimize Nitrogen Oxides ($NO_x$) in exhaust gasses, the method comprising:

controlling an ionization module configured to at least partially ionize an exhaust gas of an engine;

accelerating ions toward the surface of a metal oxide semiconductor;

identifying $NO_x$ ions present in the ionized exhaust gas; and modifying one or more selected engine parameters in response to the identified $NO_x$ levels.

20. The method of claim 19, wherein the method comprises changing resistivity in response to the presence of $NO_x$.

21. The method of claim 19, wherein the method comprises detecting an ion current.

22. An apparatus to minimize Nitrogen Oxides ($NO_x$) in exhaust gasses, the apparatus comprising:

means for controlling an ionization module configured to at least partially ionize an exhaust gas of an engine;

means for identifying $NO_x$ ions present in the ionized exhaust gas;

means for modifying one or more engine parameters in response to the identified $NO_x$ levels; and means for accelerating ions toward a surface of a metal oxide semiconductor.

23. The apparatus of claim 22, further comprising means for changing resistivity in response to the presence of $NO_x$.

24. The apparatus of claim 22, further comprising means for detecting an ion current.

* * * * *